United States Patent
Higgins

(10) Patent No.: US 7,802,433 B2
(45) Date of Patent: Sep. 28, 2010

(54) ADAPTIVE INERTIAL PARTICLE SEPARATORS AND METHODS OF USE

(75) Inventor: Timothy J. Higgins, Topsfield, MA (US)

(73) Assignee: General Electric Company, Schenectady, NY (US)

( * ) Notice: Subject to any disclaimer, the term of this patent is extended or adjusted under 35 U.S.C. 154(b) by 1036 days.

(21) Appl. No.: 11/528,219

(22) Filed: Sep. 27, 2006

(65) Prior Publication Data

US 2008/0072606 A1 Mar. 27, 2008

(51) Int. Cl.
 *F02C 7/00* (2006.01)
(52) U.S. Cl. ............... 60/779; 60/39.092; 60/39.091
(58) Field of Classification Search ............ 60/779, 60/39.092, 39.091; 244/53 B; 137/15.1; 181/214; 55/306, DIG. 14; 96/417, 397; 95/8, 11, 12; 415/121.2
See application file for complete search history.

(56) References Cited

U.S. PATENT DOCUMENTS

| | | | | |
|---|---|---|---|---|
| 2,944,731 | A * | 7/1960 | Kastan | 137/151 |
| 3,338,049 | A * | 8/1967 | Fernberger | 60/39.092 |
| 3,521,431 | A * | 7/1970 | Buckley et al. | 55/306 |
| 3,733,814 | A | 5/1973 | Hull, Jr. et al. | |
| 3,766,719 | A | 10/1973 | McAnally, III | |
| 3,952,972 | A * | 4/1976 | Tedstone et al. | 244/53 B |
| 4,098,594 | A | 7/1978 | Shorr et al. | |
| 4,346,860 | A * | 8/1982 | Tedstone | 244/53 B |
| 4,406,433 | A * | 9/1983 | Radkey et al. | 244/145 |
| 4,425,756 | A * | 1/1984 | Ballard et al. | 60/39.092 |
| 4,509,962 | A | 4/1985 | Breitman et al. | |
| 4,617,028 | A * | 10/1986 | Ray et al. | 95/267 |
| 5,039,317 | A | 8/1991 | Thompson et al. | |
| 6,134,874 | A | 10/2000 | Stoten | |
| 6,499,285 | B1 | 12/2002 | Snyder | |
| 6,508,052 | B1 | 1/2003 | Snyder et al. | |
| 6,698,180 | B2 | 3/2004 | Snyder | |
| 6,755,897 | B2 | 6/2004 | Daly | |
| 7,678,165 | B2 * | 3/2010 | Tingle et al. | 55/306 |

\* cited by examiner

*Primary Examiner*—Michael Cuff
*Assistant Examiner*—Vikansha S Dwivedi
(74) *Attorney, Agent, or Firm*—William Scott Andes, Esq.; Armstrong Teasdale LLP

(57) ABSTRACT

A method for operating a gas turbine engine including a compressor is provided. The method includes defining a predetermined concentration, placing at least one sensor in an inlet of the gas turbine engine, detecting a sand and dust concentration value using the at least one sensor; and deploying a boot to facilitate preventing particles from entering the compressor when the sand and dust concentration value equals or exceeds the predetermined concentration. The boot includes a plurality of fluid exit slots such that clean air is facilitated to be adhered to a flow path surface downstream from the boot.

18 Claims, 5 Drawing Sheets

ADAPTIVE INERTIAL PARTICLE SEPARATORS AND METHODS OF USE

BACKGROUND OF THE INVENTION

This invention relates generally to gas turbine engines, and more particularly, to adaptive inertial particle separators and methods of use.

Sand and dust ingestion in gas turbine engines may adversely affect engine performance and reliability, and may also increase the frequency of repair and maintenance required for the engines. Because flight readiness depends at least partially on reliably and properly functioning engines, reducing the occurrence of, and/or the effects of, sand and dust ingestion should facilitate enhancing the reliability of the engines.

Various methods are employed to facilitate reducing sand and dust concentrations channeled via the inlet airflow to the engine compressor. For example, known inertial particle separator (IPS) systems perform well in any weather conditions, are highly reliable, are integrated into the engine, but may not provide adequate separation efficiency during severe sand and dust conditions. Inertial inlet particle separators work by imparting momentum and trajectory on sand and dust particles to channel such particles away from the fluid stream entering the gas turbine engine. The particles removed are then collected or scavenged into an overboard dump. However, the same features that facilitate the separation of sand and dust particles from the inlet air, also cause inlet pressure losses that may detrimentally effect gas turbine engine performance. Because of the permanent nature of known IPS systems, engine performance loss is incurred in clean air and sandy air conditions.

During operation, fluid flow into a gas turbine engine inlet is channeled downstream towards an entry channel. Downstream from a convex section, fluid flow is divided into two fluid streams. One of the streams, known as a dirty fluid flow, is channeled towards a dirty fluid channel. Debris, such as birds, and particles of debris, such as snow and/or ice particles, flow through the dirty fluid channel and into the IPS scavenge system wherein the debris is ejected from gas turbine engine. The other fluid stream, known as a clean fluid flow, is channeled into a clean fluid channel. To facilitate "clean" flow into the clean fluid channel, the clean fluid flow is forced to make a sharp turn around a convex section. Most debris will not be capable of changing direction at the turn, due to the greater inertia and momentum of the debris particles. Consequently, most debris will be channeled into the dirty fluid channel, thus facilitating a flow of clean fluid into the gas turbine engine. IPS systems of this type facilitate removal of large sand particles and debris, but generally such IPS systems are not as effective in removing smaller particles or debris.

Some known helicopters are fitted with bulky barrier filters to address severe sand conditions. Although such filters satisfactorily remove sand and dust from the air, known filters are heavy, detrimentally effect engine performance, require increased maintenance, and are unable to operate in icing conditions. Moreover, known filters also cause a pressure drop at the inlet of the gas turbine engine that also adversely affects engine performance. Furthermore, known filters may also be susceptible to plugging with sand and dust.

BRIEF DESCRIPTION OF THE INVENTION

In one aspect, a method for operating a gas turbine engine including a compressor is provided. The method includes defining a predetermined concentration, placing at least one sensor in an inlet of the gas turbine engine, detecting a sand and dust concentration value using the at least one sensor and deploying a boot to facilitate preventing particles from entering the compressor when the sand and dust concentration value equals or exceeds the predetermined concentration. The boot includes a plurality of fluid exit slots such that clean air is facilitated to be adhered to a flow path surface downstream from the boot.

In another aspect, an inertial particle separation system for a gas turbine engine is disclosed. The system includes an inlet of the gas turbine engine and an inflatable boot coupled to a surface defining a flow path through the inlet. The boot includes a plurality of fluid exit slots configured to facilitate clean air to adhere to a flow path surface downstream from the boot. The system also includes means for causing the boot to be deployed.

In yet another aspect, a dual mode inertial particle separation apparatus for a gas turbine engine is provided. The apparatus includes an inertial particle separator including an entry channel and a flow path, the inertial particle separator facilitates effective removal of sand particles and debris from fluid in the entry channel during a first mode of operation of the inertial particle separator. The apparatus also includes an inflatable boot coupled to a surface of the inertial particle separator and defining the flow path. The boot is inflated during a second mode of operation of the inertial particle separator to facilitate increasing removal efficiency of sand particles and debris from fluid in the entry channel.

DETAILED DESCRIPTION OF THE INVENTION

Figure 1:
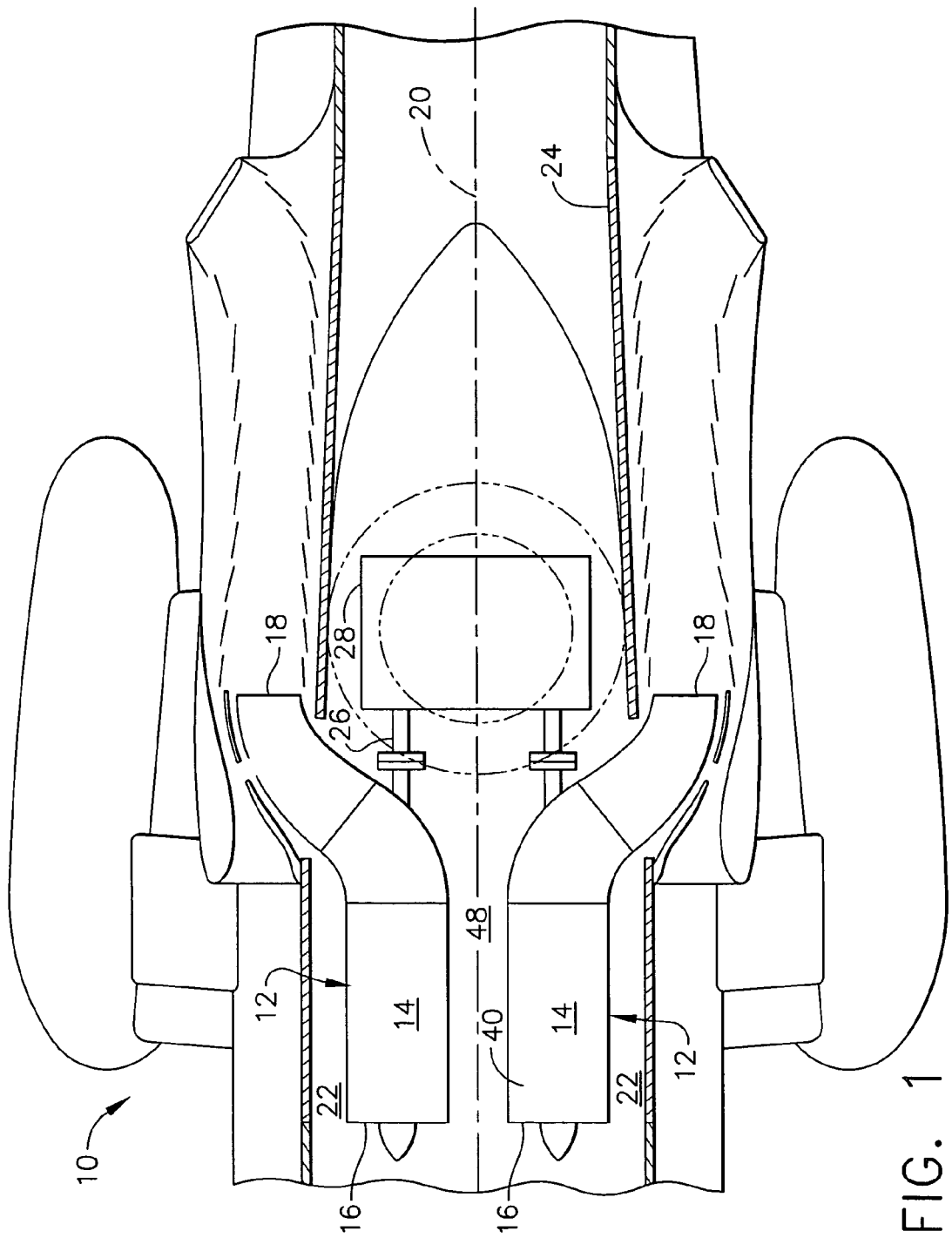
FIG. 1 is a plan view of a portion of an exemplary helicopter including two gas turbine engine assemblies.

FIG. 1 is a plan view of a portion of an exemplary helicopter 10 that includes two gas turbine engine assemblies 12. Each gas turbine engine assembly 12 includes a pair of gas turbine engines 14, each of which includes an inlet 16 and an exhaust 18. The gas turbine engines 14 are oriented symmetrically with respect to an axis of symmetry 20 extending axially between the gas turbine engines 14. Moreover, gas turbine engines 14 are mounted within an engine compartment 22 defined by a helicopter fuselage 24. A rear drive shaft 26 extends from each gas turbine engine 14 to a main transmission 28. In other designs, drive shaft 26 may extend out of the front of each engine 14.

Figure 2:
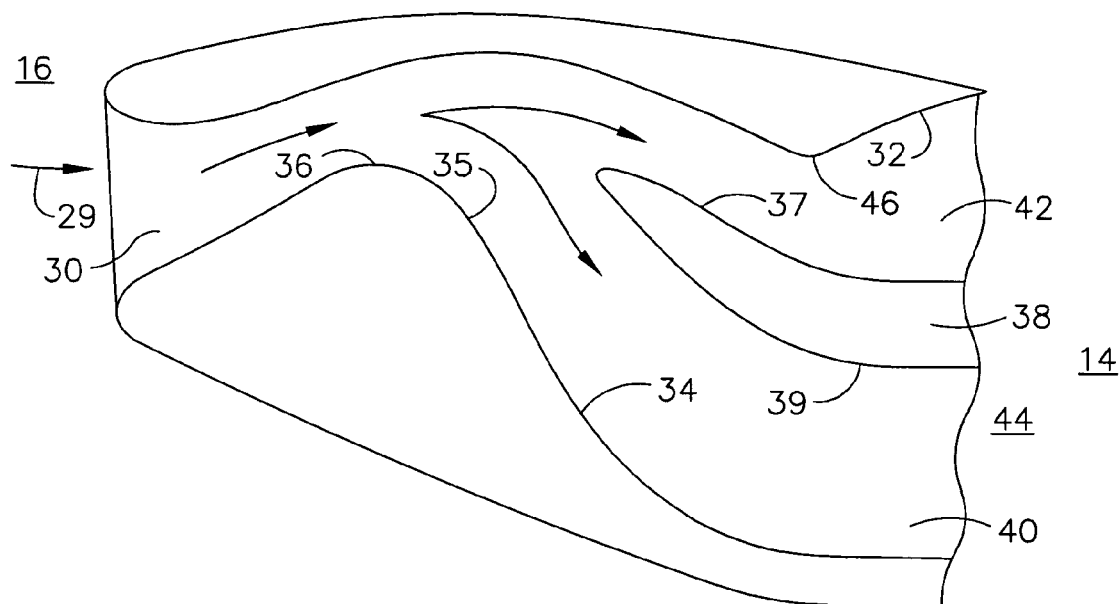
FIG. 2 is an enlarged cross-sectional view of a portion of a known gas turbine engine inlet that may be used with the engine assemblies shown in FIG. 1.

FIG. 2 is an enlarged cross-sectional view of a portion of gas turbine engine inlet 16. Inlet 16 may be integral with engine 14 or may be separate from engine 14. In the exemplary embodiment, inlet 16 functions as an inertial particle separator (IPS) and includes an entry channel 30 defined by an outer surface 32 and an inner surface 34. Inner surface 34 includes a convex section 36. A splitter 38 bifurcates entry channel 30 into a clean-fluid channel 40 and a dirty-fluid channel 42. Clean fluid channel 40 is defined by a lower surface 39 of splitter 38 and inner surface 34. Clean fluid channel 40 extends from inner surface convex section 36 to a compressor 44 included within the gas turbine engine 14. Dirty fluid channel 42 is defined by an upper surface 37 of splitter 38 and outer surface 32 and extends from convex section 36 to an IPS scavenge system (not shown). The IPS scavenge system is powered by a blower or an exhaust ejector. It should be appreciated that the term "fluid" as used herein includes any material or medium that flows, including but not limited to, gas, air and liquids.

Figure 3:
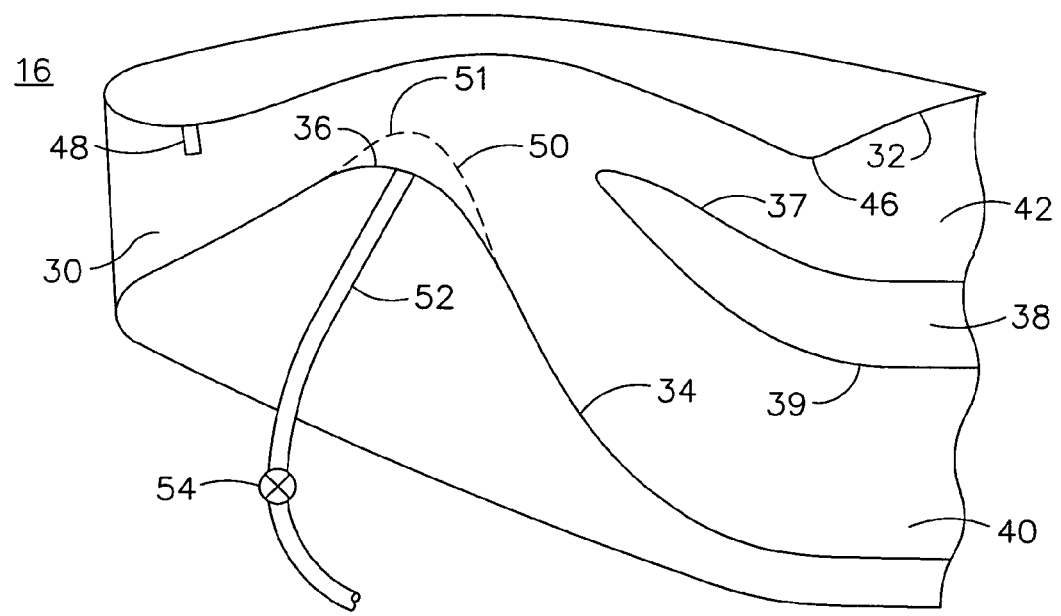
FIG. 3 is an enlarged cross-sectional view of a portion of a gas turbine engine inlet that may be used with the engine assembly shown in FIG. 2, and includes an inflatable flow path boot.

FIG. 3 is an enlarged cross-sectional view of a portion of an exemplary gas turbine engine inlet 16. In the exemplary embodiment, an inflatable flow path boot 50 that may be used with gas turbine engine 14 is coupled to the convex section 36 of inner surface 34 and a sensor 48 is coupled to outer surface 32. The inflatable flow path boot 50 may have any geometric configuration that enables inlet 16 to function as described herein. Furthermore, flow path boot 50 may be made from any material capable of withstanding the harsh operating environment of gas turbine engine inlet 16.

In the exemplary embodiment, inflatable flow path boot 50 is deployed using bleed air channeled from gas turbine engine 14. Specifically, a duct 52 extends between boot 50 and a low pressure fluid source, such as but not limited to, the low pressure compressor 44. A control valve 54 facilitates controlling fluid flow from the low pressure source to flow path boot 50.

In the exemplary embodiment, inflatable flow path boot 50 is secured to inner surface 34 and is deployable from a non-inflated operating state to an inflated operating state. During operation of gas turbine engine 14, when sand and dust, for example, are not being drawn into inlet 16, flow path boot 50 remains deflated and in its non-inflated state. In the non-inflated state, flow path boot 50 is substantially flush against inner surface 34 within convex section 36. However, when an unacceptable concentration of sand and dust is encountered or sensed entering inlet 16, flow path boot 50 is inflated such that the geometry of entry flow channel 30 and clean fluid channel 40 are changed. Specifically, the inflated flow path boot 50 effectively reshapes the convex section 36 of the inner surface 34 and narrows the throat area by forcing the top surface 51 of boot 50 towards inlet outer surface 32. In doing so, top surface 51 of boot 50 reduces the width of the entry channel 30 and causes a sharper flow path turn to be defined at a trailing edge 35 of convex section 36. Moreover, inflated boot 50 creates a sharper turn for the fluid side that most of the sand and dust particles will not be capable of undergoing due to the inertia of such particles. Consequently, a higher percentage of sand and dust particles will be channeled into the dirty fluid channel 42, such that sand and dust separation efficiency is facilitated to be enhanced.

Figure 4:
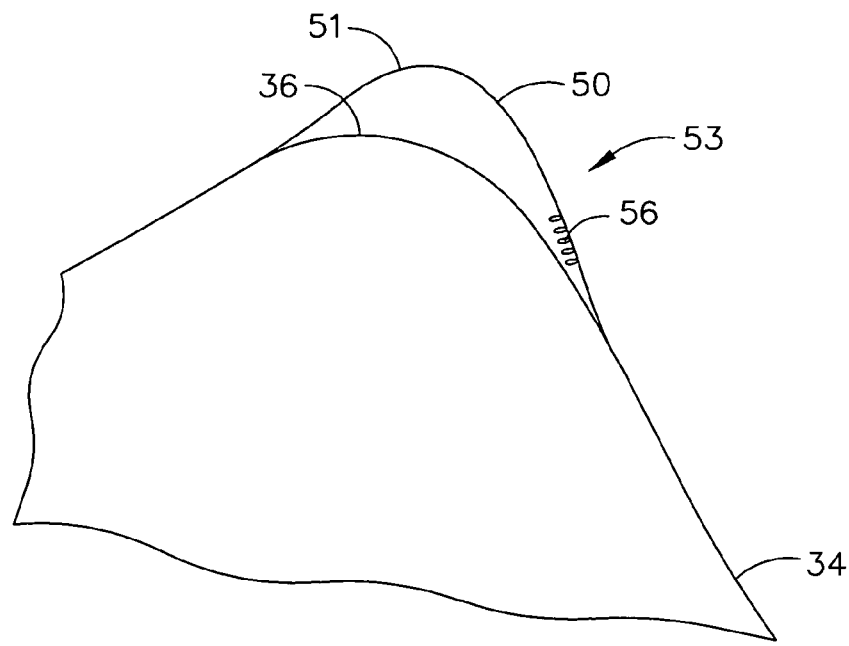
FIG. 4 is an enlarged view of a portion of the inlet shown in FIG. 2 and includes a deployed inflatable flow path boot.

FIG. 4 is an enlarged view of convex section 36 and includes an inflated flow path boot 50 extending therefrom. Flow path boot 50 includes a plurality of fluid exit slots 56. The fluid exit slots 56 facilitate returning energy into a fluid boundary layer flowing past boot 50. As such, clean fluid flow adheres more closely to a top surface 51 of flow path boot 50 and is more able to make the sharp turn at the trailing edge 53 of the convex section defined by the top surface 51 and into clean fluid channel 40. This feature allows the clean fluid flow to go around the sharper turn without separating from the top surface 51 and inner surface 34, without causing high pressure drop and flow distortion to compressor 44. It should be appreciated that fluid exit slots 56 may have any geometric shape that enables boot 50 to function as described herein, such as, but not limited to a cut in the boot 50, a rectangular opening, and/or a series of circular openings. Moreover, any number of slots 56 may be provided that enables boot 50 to function as described herein.

Sensor 48 senses the concentration of sand and dust in entry channel 30. Sensor 48 may be, but is not limited to being, a side optical device and/or a "sand sniffer" in combination with a particle analyzer. It should be appreciated that sensor 48 may be any device that facilitates determining concentrations of sand and dust in gas turbine engine inlet 16. It should also be appreciated that although this exemplary embodiment is described using a single sensor 48 disposed in the front area of inlet 16 on outer surface 32, in various other exemplary embodiments sensor 48 may be installed on any surface or any other location that enables the fluid flow within inlet 16 to be analyzed as described herein. Moreover, it should be appreciated that although this exemplary embodiment is described as including only a single sensor 48, a plurality of sensors 48 may be used to determine the concentration of sand and dust in entry channel 30. Sensor 48 communicates with a controller 100 by sending electrical signals representative of sand and dust concentrations to an input/output circuit 110.

Figure 5:
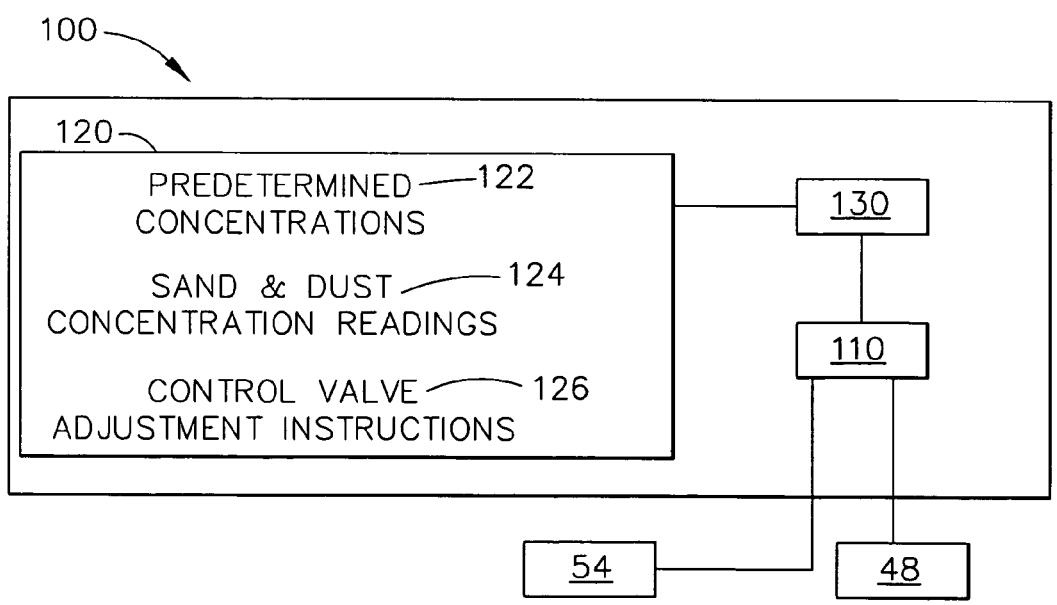
FIG. 5 is a block diagram illustrating exemplary control logic for use with the inlet shown in FIGS. 2 and 3.

FIG. 5 is a block diagram illustrating an exemplary control logic and system controller 100 for use in determining when boot 50 should be deployed. In the exemplary embodiment, the controller 100 includes an input/output circuit 110, a memory 120 and a processing circuit 130. The controller 100 communicates with sensor 48 and with control valve 54.

It should be understood that each of the circuits shown in FIG. 5 can be implemented as portions of a suitably programmed general purpose processor. As used herein, the term "processor" may include any programmable system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "processor".

The input/output interface circuit 110 receives signals transmitted to controller 100 from sand monitoring sources, such as sensor 48. In this exemplary embodiment, controller 100 receives electrical signals from the sensor 48 that represent the concentration of sand and dust in the fluid. Additionally, input/output interface circuit 110 outputs signals produced by controller 100.

The memory 120 can include one or more of a predetermined concentration portion 122, a sand and dust concentration readings portion 124, and/or a control valve adjustment instructions portion 126. The predetermined concentration portion 122 stores a predetermined value for the concentration of sand and dust in the fluid. Portion 124 stores sensor 48 readings taken during operation of gas turbine engine 14, and portion 126 stores instructions for opening and closing control valve 54.

Memory 120 can be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disk and disk drive, a writeable or rewriteable optical disk and disk drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disk, such as a CD-ROM or DVD-ROM disk, and disk drive or the like.

In this exemplary embodiment, processing circuit 130 compares each sand and dust concentration reading 124 with the predetermined concentration of sand and dust stored in the predetermined concentration portion 122. The predetermined concentration represents a threshold value that the sand and dust concentration should not equal or exceed.

Figure 6:
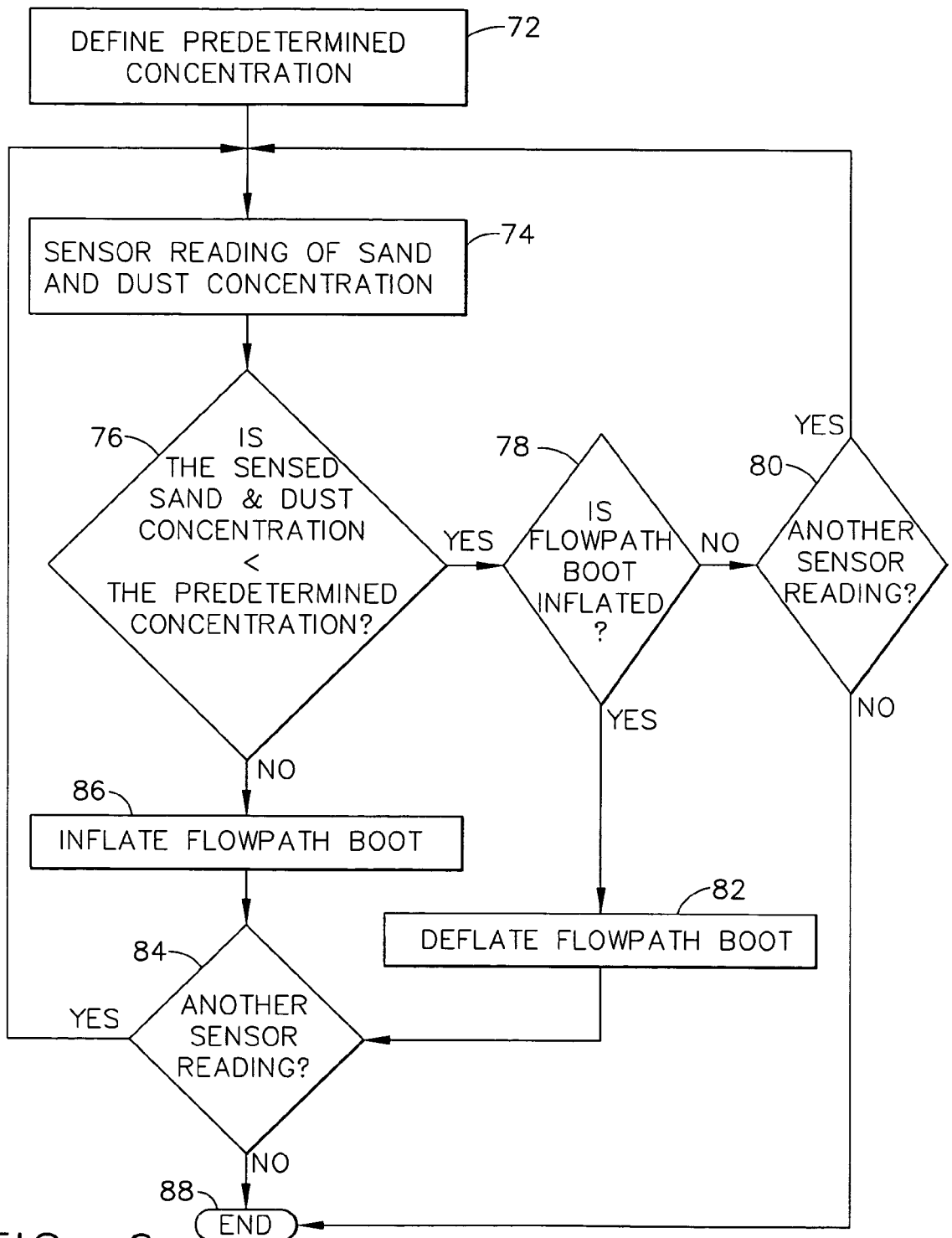
FIG. 6 is a flowchart illustrating an exemplary method for determining when to deploy the inflatable flow path boot shown in FIGS. 3 and 4.

FIG. 6 is a flowchart illustrating an exemplary method for determining when inflatable flow path boot 50 (shown in FIGS. 3 and 4) should be deployed. Initially, a set of predetermined concentrations is defined at 72. Then in step 74, sensor 48 generates a concentration reading corresponding to the amount of sand and dust in the fluid flowing in entry channel 30 (shown in FIG. 3). The concentration reading from step 74 is compared at 76 against the predetermined concentration to determine whether the concentration reading is less than the predetermined concentration. When the concentration reading is less than the predetermined concentration, operation proceeds to step 78. Otherwise, operation proceeds to step 86. The following discussion describes operation proceeding to step 78, then describes operation proceeding to step 86.

At step 78, a decision is made regarding whether the flow path boot 50 is inflated. If boot 50 is not inflated, operation proceeds to step 80 where a decision is made regarding whether additional sand and dust concentration readings are warranted. If additional readings are warranted, operation continues to step 74. If no additional readings are warranted, operation continues to step 88 wherein operation ends. At step 78, if boot 50 is inflated, operation proceeds to step 82.

At step 82, a signal is sent from the input/output circuit 110 to control valve 54. The signal instructs control valve 54 to close. Accordingly, fluid stops flowing to flow path boot 50 causing boot 50 to deflate. Operation then proceeds to step 84. At step 84, a decision is made regarding whether additional sand and dust concentration readings are warranted. If additional readings are warranted, operation continues to step 74. If no additional readings are warranted, operation continues to step 88 wherein operation ends.

At step 76, when the concentration reading is not less than the predetermined concentration, operation proceeds to step 86. At step 86, a signal is sent from the input/output circuit 110 to control valve 54. The signal instructs control valve 54 to open. Accordingly, fluid flows to flow path boot 50 causing boot 50 to inflate. Operation then proceeds to step 84. At step 84, a decision is made regarding whether additional sand and dust concentration readings are warranted. If additional readings are warranted, operation continues to step 74. If no additional readings are warranted, operation continues to step 88 wherein operation ends. Thus, this exemplary embodiment enables craft to operate more efficiently when free of sand and dust conditions, versus operating with boot 50 constantly deployed.

Figure 7:
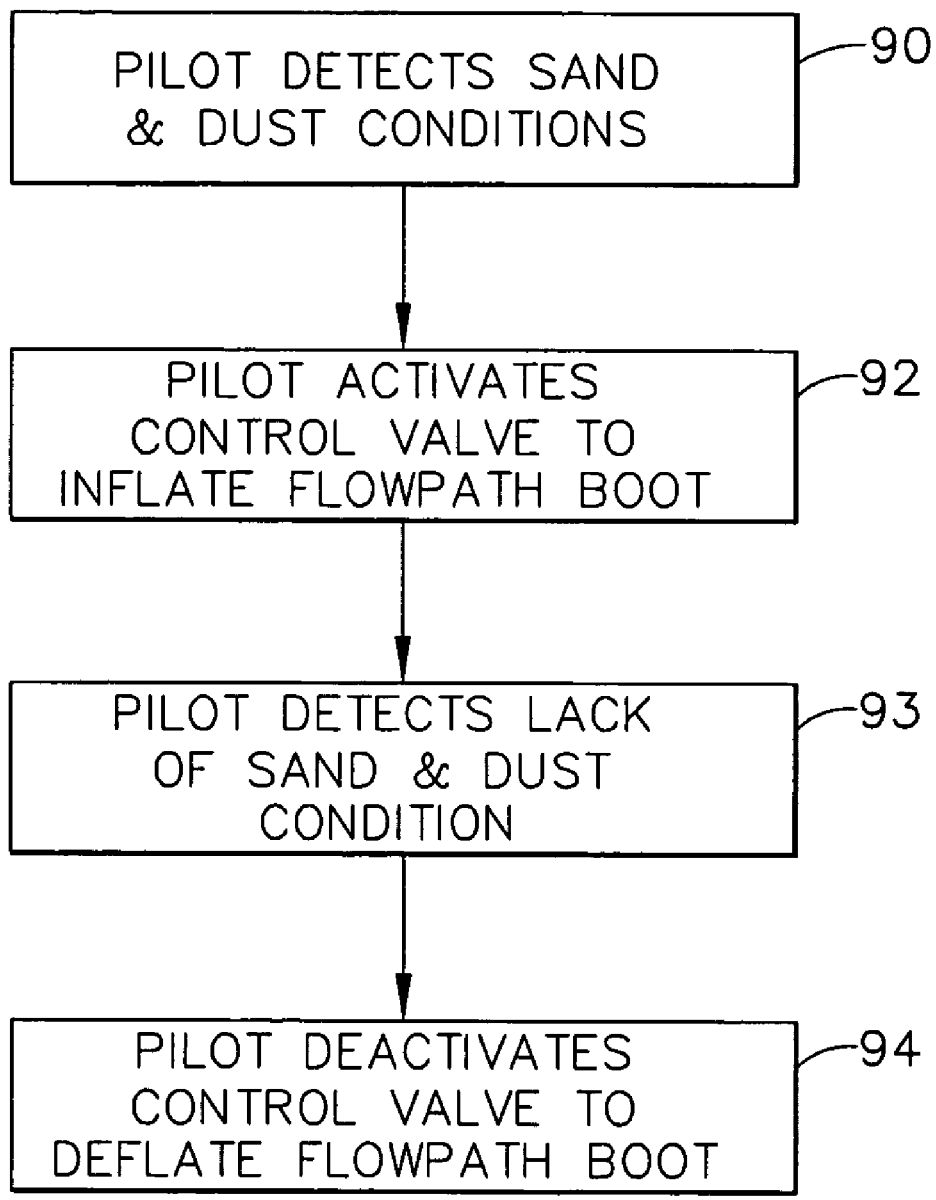
FIG. 7 is a flowchart illustrating another exemplary method for determining when to deploy the inflatable flow path boot shown in FIGS. 3 and 4.

FIG. 7 is a flowchart illustrating another exemplary method for determining when inflatable flow path boot 50 (shown in FIGS. 3 and 4) should be deployed. Initially, an aircraft operator, or pilot, detects sand and dust conditions at 90. Then in step 92, the operator uses an activator (not shown) to open control valve 54, such that fluid flows to flow path boot 50 causing boot 50 to inflate. It should be appreciated that the activator may be any kind of activator that enables control valve 54 to function as described herein. When the aircraft operator does not detect a sand and dust condition at 93, operation proceeds to step 94. At step 94, the aircraft operator uses the activator (not shown) to close control valve 54, such that fluid ceases to flow to control path boot 50 causing boot 50 to deflate. Thus, this exemplary embodiment also enables craft to operate more efficiently when free of sand and dust conditions, versus operating with boot 50 constantly deployed.

The exemplary embodiments described herein use the available space around the nose gearbox of a gas turbine engine 14 to cause fluid entering the inlet to turn abruptly through a two dimensional inertial particle separator before transitioning into the gas turbine engine 14 itself. For example, if applied to a CH53 aircraft, the system could replace the aircraft inlet duct and EAPs system and is substantially more compact and lighter. Also disclosed herein, as part of the system, is an inflatable flow path boot 50 powered by low pressure engine bleed fluid. The bleed fluid may be controlled automatically using the controller 100 or, alternatively, may be controlled by aircraft operator action. Using the bleed fluid, the flow path boot 50 creates a sharper turn for the fluid, which facilitates enhancing higher sand separation efficiency. Aerodynamically designed fluid exit slots 56 are provided in boot 50 to facilitate delaying or preventing flow separation of the fluid in the flow path from inner surface 34, despite the sharp turning angle of the fluid at the trailing edge 53 of the convex section defined by the top surface 51.

The combination of the flow path boot 50 and the fluid exit slots 56 offers a significant reliability advantage over conventional inertial particle separators. The fluid flow path only follows the aggressive turning configuration at the trailing edge 53 of the convex portion defined by the top surface 51 if there is fluid available to inflate boot 50 and to blow the boundary layer control fluid. Additionally, should the control valve 54 supplying fluid to the boot 50 malfunction, there is no risk of the inlet separating and causing an engine operability issue.

In each embodiment, the above-described inflatable boot with blowing slots facilitates sand and dust removal from the clean fluid entering the engine. More specifically, in each embodiment, the inflated boot creates a sharper turn that most sand and dust particles will not be capable of undergoing due to the inertia of such particles. As a result, during engine operation fewer sand and dust particles enter the engine. Accordingly, engine performance and component useful life are each facilitated to be enhanced in a cost effective and reliable manner. Moreover, the invention provides a means wherein existing inertial particle separators can be modified to facilitate enhancing turbine engine performance.

Exemplary embodiments of inertial particle separators are described above in detail. The inflatable boots are not limited to use with the specific inertial particles separator embodiments described herein, but rather, the inflatable boots can be utilized independently and separately from other inertial particle separator components described herein. For example, the inflatable boots described herein may be retrofitted in most helicopter engines and may be used for a wide range of flow control scenarios, including aircraft control surfaces. Moreover, the invention is not limited to the embodiments of the inflatable boots described above in detail. Rather, other variations of inflatable boot embodiments may be utilized within the spirit and scope of the claims.

While the invention has been described in terms of various specific embodiments, those skilled in the art will recognize that the invention can be practiced with modification within the spirit and scope of the claims.

What is claimed is:

1. A method for operating a gas turbine engine including a compressor, said method comprising:
   defining a predetermined concentration of at least one of sand and dust in an inlet of the gas turbine engine;
   detecting a concentration value of at least one of sand and dust in the gas turbine engine inlet using at least one sensor; and
   deploying an inflatable flow path boot positioned within a surface of the gas turbine engine inlet to facilitate preventing at least one of sand and dust particles from entering the compressor when the concentration value of the at least one of sand and dust equals or exceeds the predetermined concentration, and including a plurality of fluid exit slots disposed in the boot on a downstream side of the boot such that clean air is facilitated to be adhered to a flow path surface downstream from the boot.

2. A method in accordance with claim 1 wherein the inlet includes an entry channel, said method further comprises coupling the at least one sensor on a surface defining the entry channel.

3. A method in accordance with claim 1 wherein deploying the boot further comprises inflating the boot using bleed fluid.

4. A method in accordance with claim 1 wherein deploying the boot comprises narrowing a throat area of the inlet, and enhancing a flow path turn at a trailing edge of the throat area.

5. A method in accordance with claim 1 further comprising channeling fluid flow to the boot through at least one control valve configured to control flow to the boot.

6. A method in accordance with claim 5 further comprising coupling the at least one control valve to a processor to facilitate controlling deployment of the boot.

7. A method in accordance with claim 5 further comprising transmitting a signal representing an instruction to the at least one control valve to facilitate controlling fluid flow to the boot.

8. A method in accordance with claim 5 further comprising using the at least one control valve to selectively inflate and deflate the boot.

9. An inertial particle separation system for a gas turbine engine, said system comprising:
   an inlet of said gas turbine engine including at least one sensor configured to determine a concentration of at least one of sand and dust in said inlet;
   an inflatable boot coupled to a surface defining a flow path through said inlet, said boot comprising a plurality of fluid exit slots on a downstream side of the boot, said slots configured to facilitate clean air to adhere to a flow path surface downstream from said boot; and
   a controller configured to:
      receive a signal from said at least one sensor, the signal representative of the concentration;
      compare the received signal to a value representative of a threshold of the concentration; and
      inflate or deflate the inflatable boot based on the comparison.

10. A system in accordance with claim 9 wherein said system controller is coupled to said at least one sensor to compare a sensed concentration value with a predetermined concentration stored in said controller, said controller configured to cause said boot to be deployed when said sensed concentration value equals or exceeds said predetermined concentration.

11. A system in accordance with claim 9 wherein said inlet includes an entry channel, said at least one sensor is coupled to a surface defining a flow path through said entry channel.

12. A system in accordance with claim 9 wherein said inflatable boot is deployed using bleed fluid from the gas turbine engine.

13. A system in accordance with claim 11 wherein said boot is configured to create a sharp turn for fluid entering a clean fluid channel.

14. A system in accordance with claim 9 wherein each one of said plurality of fluid exit slots is configured to inject energy into a boundary layer downstream from said boot.

15. A system in accordance with claim 10 wherein said boot is selectively inflated and deflated based on a concentration of particles in fluid entering the gas turbine engine.

16. A dual mode particle inertial separation apparatus for a gas turbine engine, said apparatus comprising:
   an inertial particle separator comprising an entry channel and a flow path, said inertial particle separator facilitating effective removal of at least one of sand particles and debris from a flow of fluid in said entry channel during a first mode of operation of said inertial particle separator; and
   an inflatable boot coupled to a surface of said inertial particle separator and defining at least a portion of said flow path, said boot inflated is during a second mode of operation of said inertial particle separator to narrow a throat area of said entry channel by forcing the inflatable boot 50 towards an opposite surface of said inertial particle separator to facilitate increasing removal efficiency of the at least one of sand particles and debris from the flow of fluid in said entry channel.

17. An apparatus in accordance with claim 16 wherein at least one sensor is coupled to a surface defining said flow path through said entry channel.

18. An apparatus in accordance with claim 17 wherein said boot is configured to create a sharp turn for fluid entering a clean fluid channel in said inertial particle separator.

* * * * *